United States Patent
Sawanaka

(10) Patent No.: US 8,730,622 B2
(45) Date of Patent: May 20, 2014

(54) DISK DRIVE WITH SPOILER HAVING SHIELD MEMBER

(75) Inventor: Kenichi Sawanaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/550,933

(22) Filed: Jul. 17, 2012

(65) Prior Publication Data

US 2013/0188280 A1    Jul. 25, 2013

(30) Foreign Application Priority Data

Jan. 20, 2012    (JP) .................................. 2012-010114

(51) Int. Cl.
*G11B 33/14*    (2006.01)

(52) U.S. Cl.
USPC .................. 360/264.8; 360/97.14; 360/97.15

(58) Field of Classification Search
USPC ....................... 360/97.13–97.15, 264.3, 264.8
See application file for complete search history.

(56) References Cited

U.S. PATENT DOCUMENTS

| | | | | |
|---|---|---|---|---|
| 5,907,453 A | * | 5/1999 | Wood et al. ................. | 360/97.17 |
| 6,125,003 A | * | 9/2000 | Tsuda et al. ............... | 360/99.18 |
| 6,347,023 B1 | * | 2/2002 | Suwa ......................... | 360/264.8 |
| 2005/0185324 A1 | * | 8/2005 | Suwa et al. ................ | 360/97.02 |
| 2010/0134920 A1 | | 6/2010 | Mizumoto et al. | |

FOREIGN PATENT DOCUMENTS

| | | |
|---|---|---|
| JP | 01-192075 A | 8/1989 |
| JP | 02-078003 A | 3/1990 |
| JP | 2010-134988 A | 6/2010 |

\* cited by examiner

*Primary Examiner* — Nathan Danielsen

(74) *Attorney, Agent, or Firm* — Knobbe Martens Olson & Bear LLP

(57) ABSTRACT

According to one embodiment, a disk drive includes a case including a base with a bottom wall, a drive motor on the bottom wall of the base, a plurality of disk recording mediums rotatable by the drive motor, a magnetic head configured to perform data processing on the recording mediums, a carriage on the bottom wall of the base, configured to support the magnetic head for movement relative to the recording mediums, a drive section including a yoke and a magnet on the bottom wall of the base and configured to drive the carriage, and a spoiler including a main body, which includes a magnetic shield member between the yoke and the recording mediums, and a baffle plate extending from the main body and between the adjacent disk recording mediums.

20 Claims, 9 Drawing Sheets

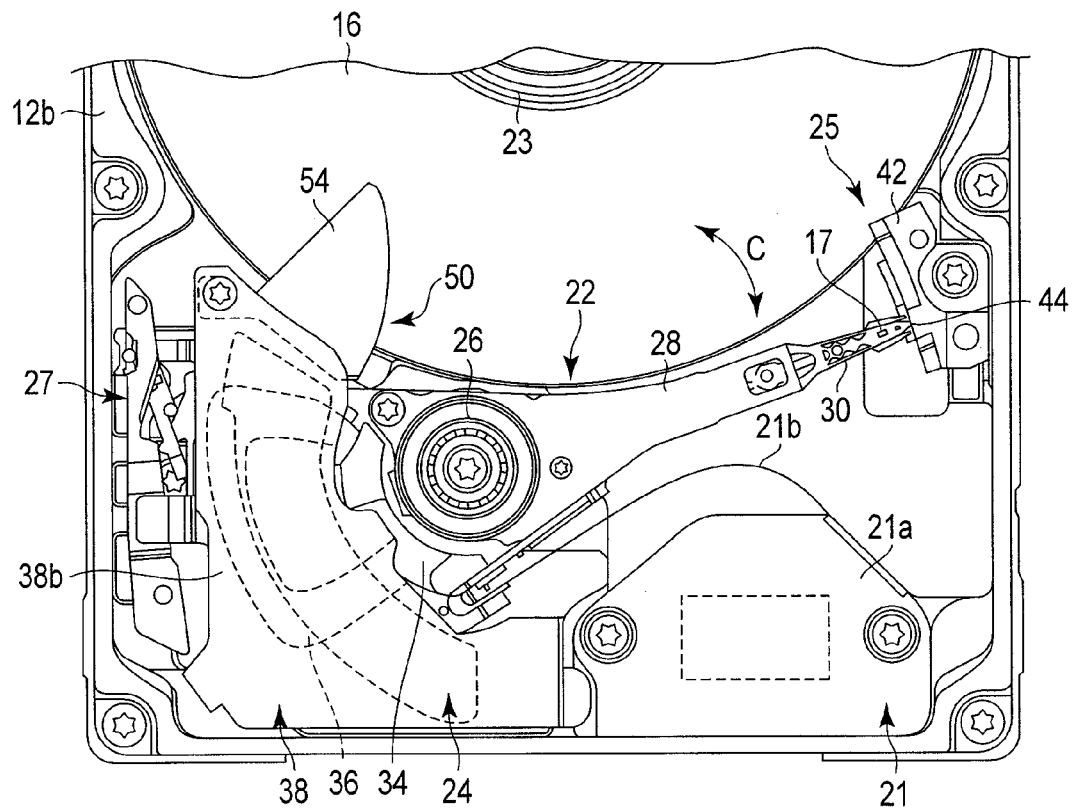
F I G. 2
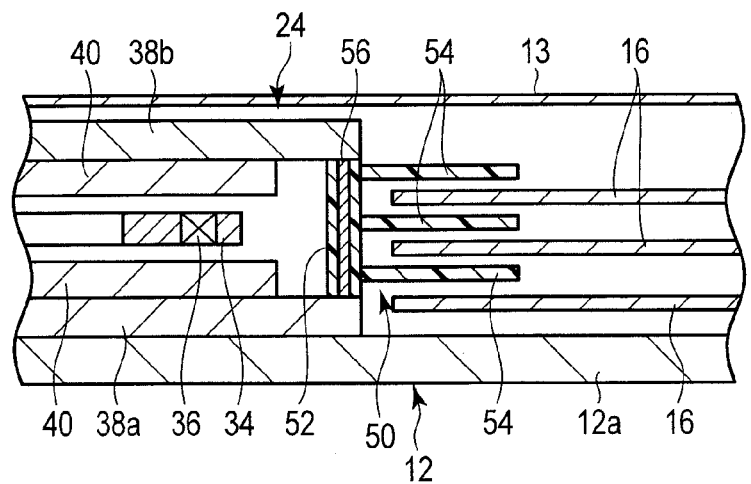
F I G. 3

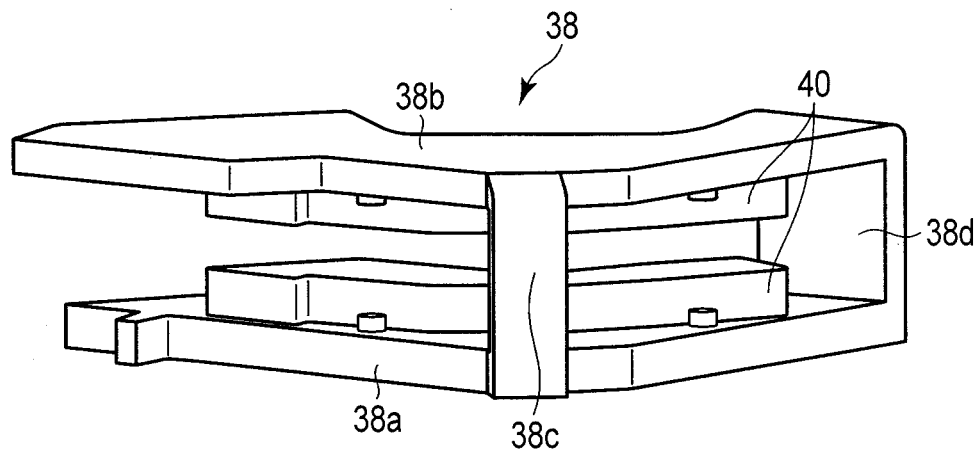
F I G. 4
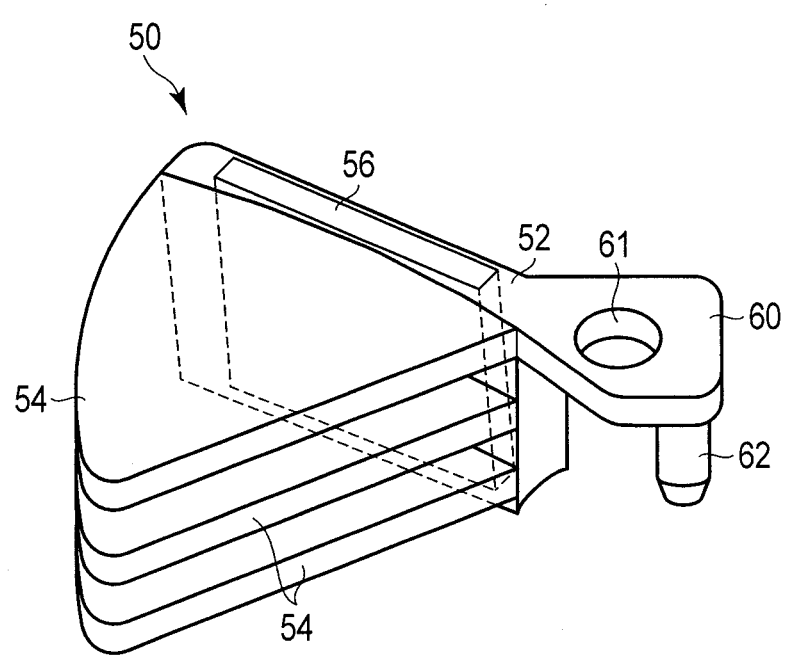
F I G. 5

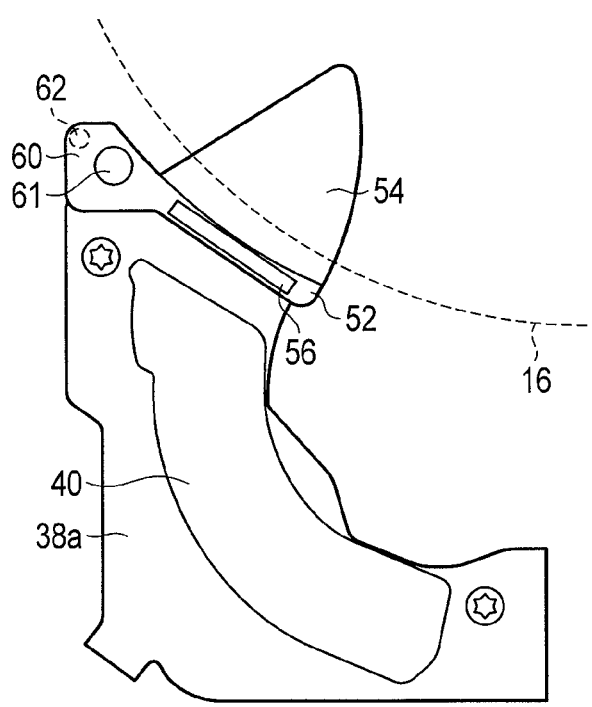
F I G. 8
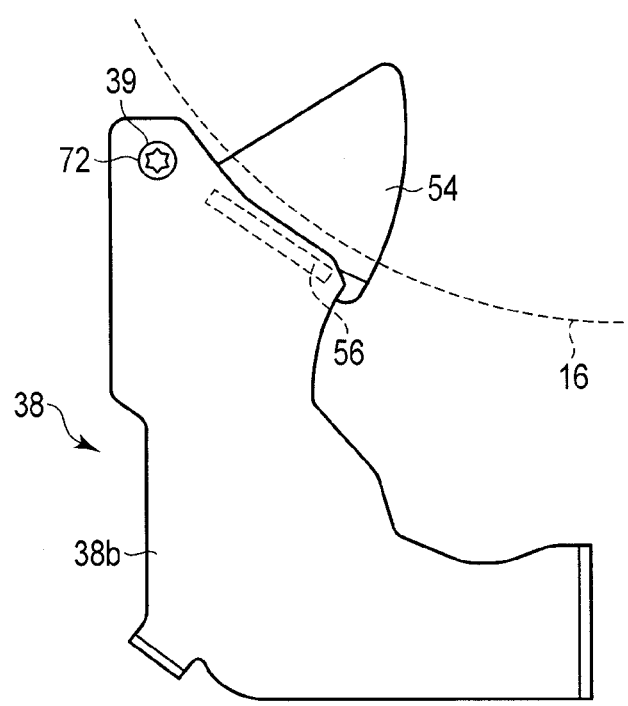
F I G. 9

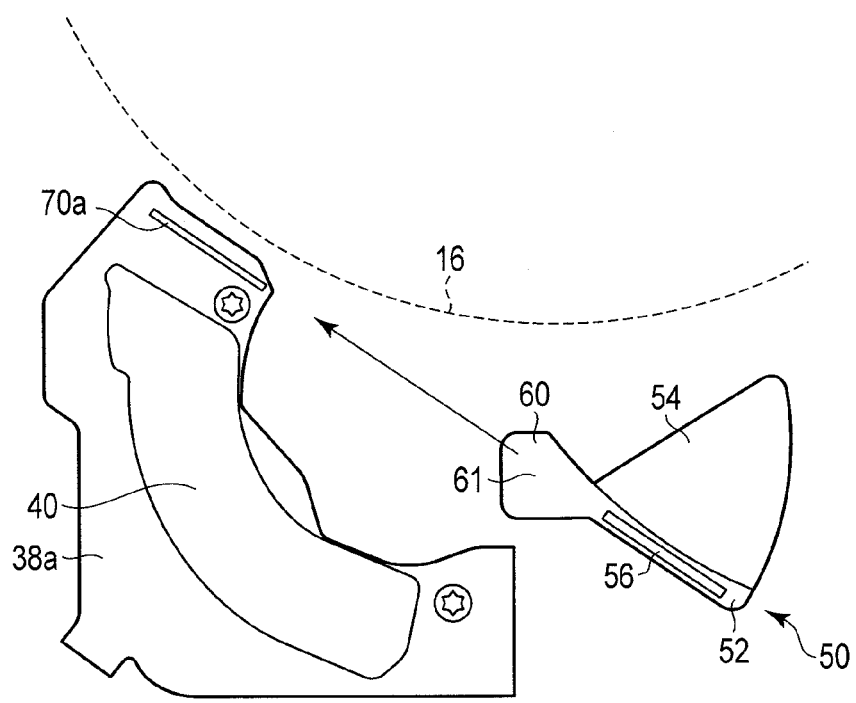
F I G. 10
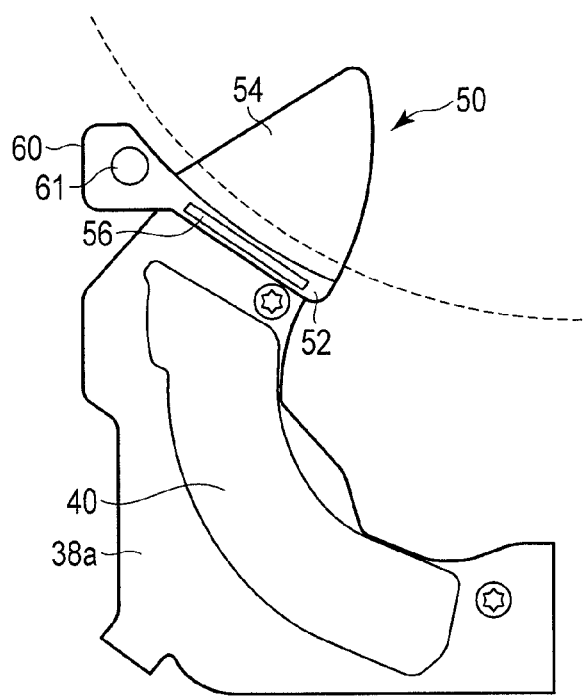
F I G. 11

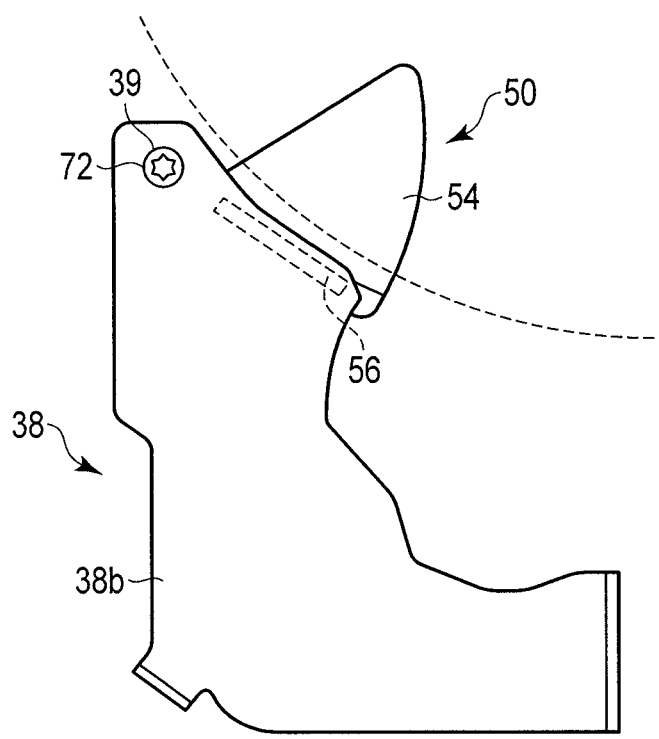
F I G. 12
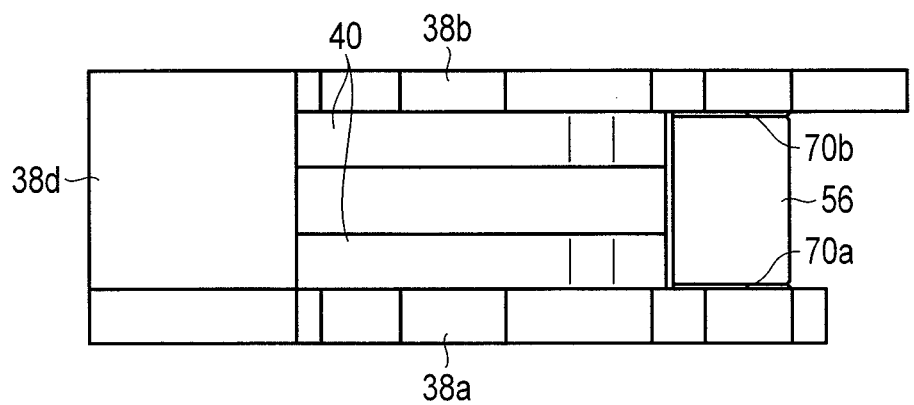
F I G. 13

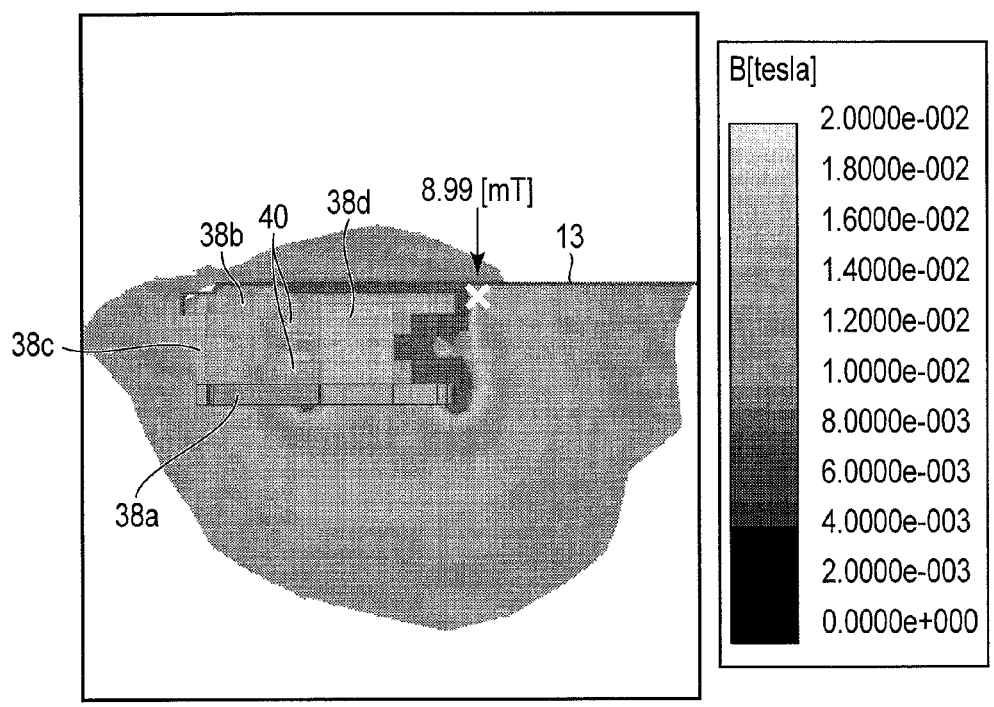
F I G. 14
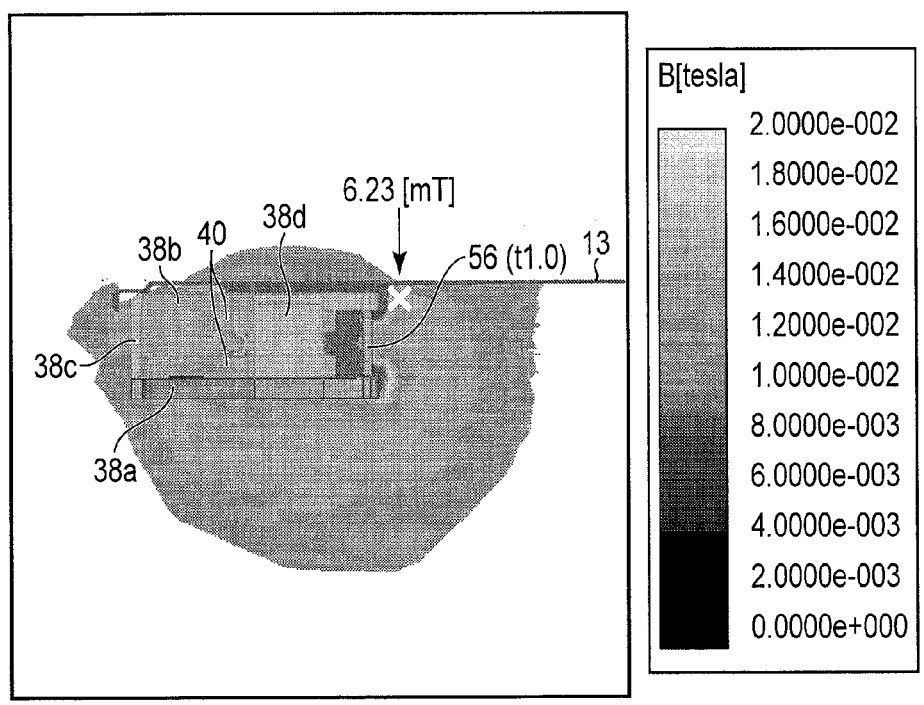
F I G. 15

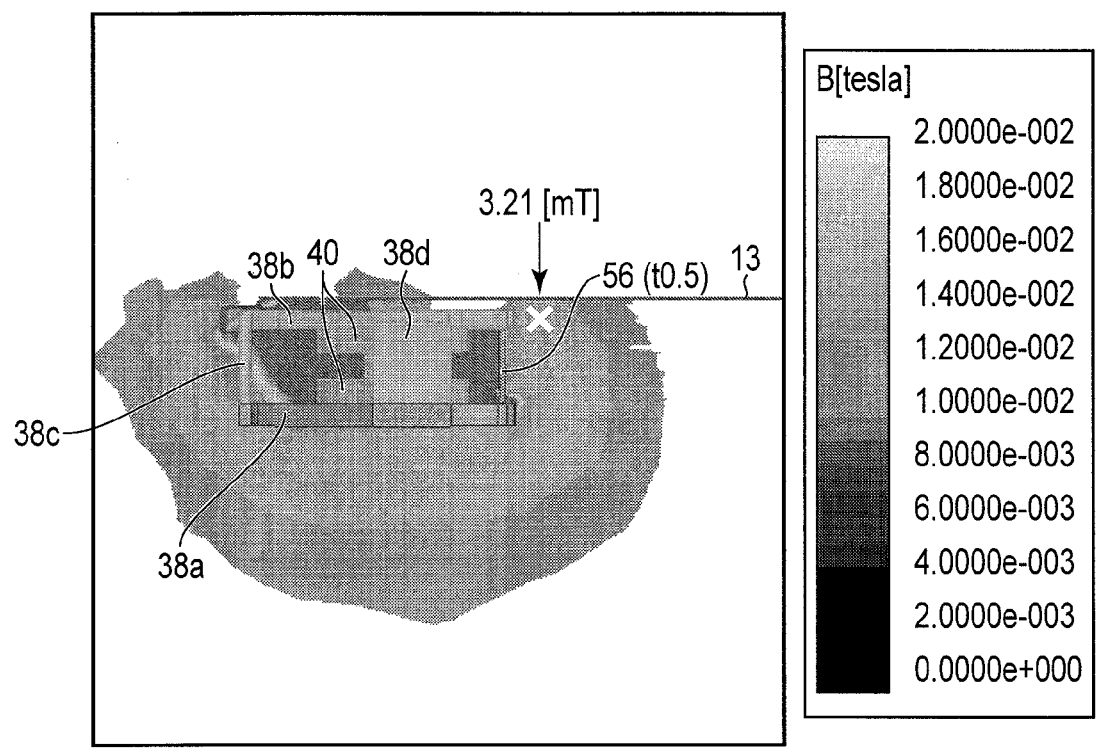
F I G. 16

DISK DRIVE WITH SPOILER HAVING SHIELD MEMBER

CROSS-REFERENCE TO RELATED APPLICATIONS

This application is based upon and claims the benefit of priority from prior Japanese Patent Application No. 2012-010114, filed Jan. 20, 2012, the entire contents of which are incorporated herein by reference.

FIELD

Embodiments described herein relate generally to a disk drive with a disk recording medium rotatable at high speed.

BACKGROUND

In general, a magnetic disk drive, such as a hard disk drive (HDD), comprises a magnetic disk, spindle motor for rotating the magnetic disk, magnetic head for reading data from and writing data to the magnetic disk, carriage supporting the magnetic head, voice coil motor for driving the carriage, board unit, etc. These elements are accommodated in a substantially sealed housing. A drive section, comprising the spindle motor, carriage, voice coil motor, etc., and the board unit are mounted on the bottom wall of the housing.

In the magnetic disk drive, the rotation speed of the magnetic disk must be increased to achieve high-speed data processing. If the magnetic disk rotates at high speed, however, airflow is produced in the direction of rotation of the magnetic disk, and a phenomenon called disk flutter occurs such that the magnetic disk is caused to vibrate by turbulence of the airflow. Further, airflow disturbance acts on the carriage that supports the magnetic head, thereby displacing the carriage. In this case, the positioning accuracy of the magnetic head relative to the magnetic disk is reduced, so that the recording density cannot be improved. In order to suppress the occurrence of air turbulence due to high-speed rotation of the magnetic disk, a magnetic disk drive has been proposed in which a spoiler for use as a baffle plate is disposed between magnetic disks.

In Enterprise and Nearline HDDs used for server application, moreover, a strongly-magnetized magnetic circuit is used for the voice coil motor to facilitate high-speed seek of the carriage. In a typical conventional structure, outward leakage of magnetic flux from this magnetic circuit is prevented by a return yoke configuration formed by bending a top or bottom yoke of the voice coil motor.

In the case where the return yoke is used to prevent leakage of magnetic flux toward the magnetic disk, the return yoke must be located near the magnetic disk. If the spoiler is also assumed to be used in this case, consideration must be given to interference between the return yoke and spoiler during assembly and installation. If the conventional configuration is expected to allow the use of the spoiler while preventing leakage of magnetic flux, the installation of the spoiler is very difficult, and the shapes of the spoiler and yoke and methods for securing them are restricted in design.

BRIEF DESCRIPTION OF THE DRAWINGS

FIG. 2 is a plan view showing about half of the HDD on the side where a carriage assembly is disposed;

FIG. 3 is a sectional view of the HDD including a VCM portion and spoiler taken along line A-A of FIG. 1;

FIG. 4 is a perspective view showing a yoke of the VCM;

FIG. 5 is an enlarged perspective view showing the spoiler;

FIG. 8 is a plan view showing how the bottom yoke is located below the spoiler in an assembly process for the HDD;

FIG. 9 is a plan view showing how a top yoke is fixedly located on the bottom yoke in an assembly process for the HDD;

FIG. 10 is a plan view showing a step of installing a bottom yoke and spoiler in an assembly process for an HDD according to a second embodiment;

FIG. 11 is a plan view showing how the bottom yoke and spoiler are located in position in an assembly process for the HDD according to the second embodiment;

FIG. 12 is a plan view showing how a top yoke is fixedly located on the bottom yoke in an assembly process for the HDD;

FIG. 13 is a perspective view showing a yoke and metal plate of the HDD;

FIG. 14 is a diagram showing the result of simulation of leakage magnetic flux distribution for a yoke according to a comparative example without the metal plate;

FIG. 15 is a diagram showing the result of simulation of leakage magnetic flux distribution for the HDD according to the first embodiment; and FIG. 16 is a diagram showing the result of simulation of leakage magnetic flux distribution for the HDD according to the second embodiment.

DETAILED DESCRIPTION

Various embodiments will be described hereinafter with reference to the accompanying drawings. In general, according to one embodiment, a disk drive includes a case including a base with a bottom wall; a drive motor on the bottom wall of the base; a plurality of disk recording mediums rotatable by the drive motor; a magnetic head configured to perform data processing on the disk recording mediums; a carriage on the bottom wall of the base, configured to support the magnetic head for movement relative to the disk recording mediums; a drive section including a yoke and a magnet on the bottom wall of the base and configured to drive the carriage; and a spoiler including a main body, which includes a magnetic shield member between the yoke and the recording mediums, and a baffle plate extending from the main body and between the adjacent disk recording mediums.

First Embodiment

Figure 1:
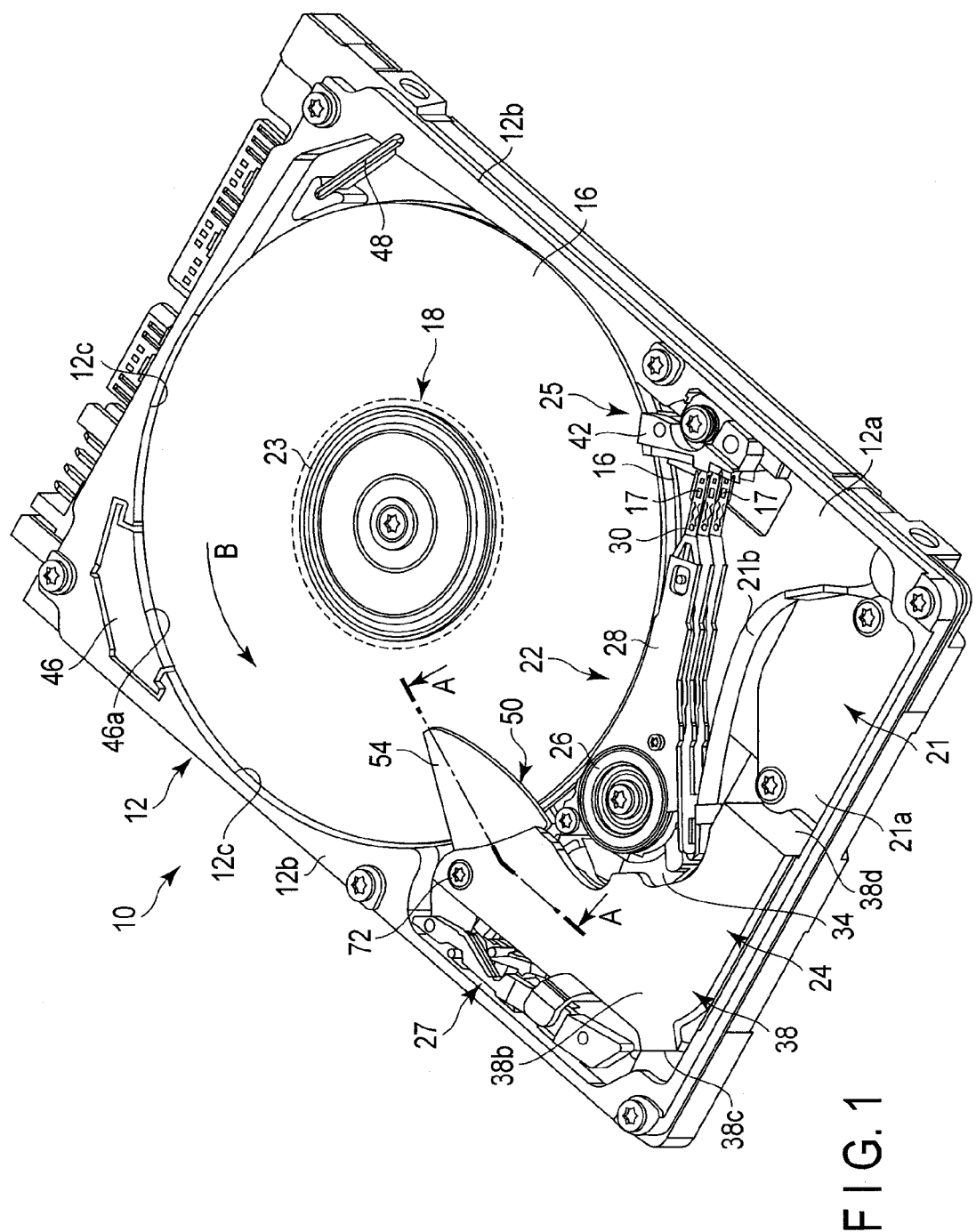
FIG. 1 is a perspective view showing a magnetic disk drive (HDD) according to a first embodiment with its top cover removed.

FIGS. 1 to 5 show an HDD according to a first embodiment. As shown in FIGS. 1 to 3, the HDD comprises a case (housing) 10. The case 10 comprises a base 12 in the form of an open-topped rectangular box and a top cover 13 (FIG. 3), which is attached to the base by screws such that it closes the top opening of the base. The base 12 comprises a rectangular bottom wall 12a and a sidewall 12b set up along the peripheral edge of the bottom wall. The base 12 is integrally formed by die-casting a metal such as aluminum.

A spindle motor 18 and a plurality (e.g., three) of magnetic disks 16 are disposed in the case 10. The spindle motor 18 is mounted on the bottom wall 12a of the base 12 and functions as a drive motor. The magnetic disks 16 are supported and rotated by the spindle motor. Further, the case 10 contains a plurality (e.g., six) of magnetic heads 17, carriage assembly 22, voice coil motor (VCM) 24, ramp loading mechanism 25, inertial latch mechanism 27, and board unit 21. The magnetic heads 17 record data on and reproduce data from the magnetic disks 16. The carriage assembly 22 supports the magnetic heads 17 for movement relative to the magnetic disks 16. The VCM 24 pivots and positions the carriage assembly. The ramp loading mechanism 25 holds the magnetic heads in a retracted position off the magnetic disks when the magnetic heads are moved to the outermost peripheries of the magnetic disks. The inertial latch mechanism 27 holds the carriage assembly in its retracted position if the HDD is jolted, for example. The board unit 21 comprises a preamplifier and the like.

A printed circuit board (not shown) is attached to the outer surface of the bottom wall 12a of the base 12 by screws. The circuit board constitutes a control section that controls the operations of the spindle motor 18, VCM 24, and magnetic heads through the board unit 21.

Each magnetic disk 16 for use as a recording medium is formed with a diameter of, for example, 65 mm (2.5 inches) and comprises magnetic recording layers on its upper and lower surfaces, individually. The three magnetic disks 16 are coaxially mounted on a hub (not shown) of the spindle motor 18 and located in layers with gaps between them. The magnetic disks 16 are clamped and secured to the hub by a clamp spring 23. Thus, the magnetic disks 16 are supported parallel to the bottom wall 12a of the base 12. The magnetic disks 16 are rotated in the direction of arrow B at a predetermined rotation speed, for example, 5,400 or 7,200 rpm by the spindle motor 18.

That part of the sidewall 12b of the base 12 which is located in substantially half the area of the base 12 with respect to its longitudinal direction surrounds the outer peripheral edges of the magnetic disks 16. The sidewall 12b comprises a facing surface 12c that stands substantially upright from the bottom wall 12a. The facing surface 12c continuously extends in a circular arc along and opposite the outer peripheral edges of the magnetic disks 16 with a small gap therebetween. Thus, the sidewall 12b comprising the facing surface 12c constitutes a shroud for the magnetic disks 16.

As shown in FIGS. 1 and 2, the carriage assembly 22 comprises a bearing 26 secured to the bottom wall 12a of the base 12 and six arms 28 extending from the bearing. The bearing 26 is spaced apart from the center of rotation of the magnetic disks 16, longitudinally relative to the base 12, and is located near the outer peripheral edges of the magnetic disks 16. The six arms 28 are arranged parallel to the surfaces of the magnetic disks 16 and at predetermined spaces from one another and extend in the same direction from the bearing 26. The carriage assembly 22 comprises elastically deformable suspensions 30 each in the form of an elongated plate. Each suspension 30 is formed of a plate spring, the proximal end of which is secured to the distal end of its corresponding arm 28 by spot welding or adhesive bonding and extends from the arm. Alternatively, each suspension 30 may be formed integrally with its corresponding arm 28.

Each magnetic head 17 is mounted on an extended end of its corresponding suspension 30. Each magnetic head 17 comprises a substantially rectangular slider and magnetoresistive (MR) read/write head formed on the slider and is secured to a gimbal portion formed on the distal end of the suspension 30. Each two of the six magnetic heads 17 mounted individually on the suspensions 30 are located opposite each other so that each corresponding magnetic disk 16 is sandwiched between them.

The carriage assembly 22 comprises a support frame 34 extending from the bearing 26 so as to be directed opposite from the arms 28. The support frame 34 supports a voice coil 36 that constitutes a part of the VCM 24. The frame 34 is a plastic structure that is molded integrally on the outer periphery of the voice coil 36.

As shown in FIGS. 1 to 4, the VCM 24, which functions as a drive section, comprises a yoke 38 and magnets 40 mounted on the yoke. Specifically, the yoke 38 comprises a plate-like bottom yoke 38a, plate-like top yoke 38b, and return yokes 38c and 38d. The bottom yoke 38a is located on the bottom wall 12a of the base 12. The top yoke 38b is located opposite the bottom yoke with a gap therebetween and on the top-opening side of the base 12. The return yokes 38c and 38d connect the bottom and top yokes to each other. Each of the return yokes 38c and 38d is formed by bending a part of the top yoke 38b and its distal end contacts the bottom yoke. The return yokes 38c and 38d are disposed on the outside of the central part of the yoke 38 and that end of the yoke which is located farther from the magnetic disks 16, respectively. The other end of the yoke 38 is located near the outer peripheral edges of the magnetic disks 16. Each of the return yokes 38c and 38d may be formed by bending a part of the bottom yoke 38a.

The magnets 40 are plates that are secured individually to the respective inner surfaces of the bottom and top yokes 38a and 38b and located opposite each other with a gap therebetween. The voice coil 36 mounted on the carriage assembly 22 is located between the two magnets 40.

If the voice coil 36 is energized, the carriage assembly 22 pivots in the direction of arrow C about the bearing 26, whereupon each magnetic head 17 is moved to and positioned in a region above a desired track of the corresponding magnetic disk 16. Thus, the magnetic head 17 can write data to or read data from the magnetic disk 16. The carriage assembly 22 and VCM 24 constitute a head actuator.

The ramp loading mechanism 25 comprises a ramp 42, disposed on the bottom wall 12a of the base 12 and located outside the magnetic disks 16, and tabs 44 that extend individually from the respective distal ends of the suspensions 30. The ramp 42 is located downstream relative to the bearing 26 with respect to the direction of rotation B of the magnetic disks 16. When the carriage assembly 22 pivots so that the magnetic heads 17 are moved to the retracted position outside the magnetic disks 16, each tab 44 engages with a ramp surface formed on the ramp 42, and is then pushed up the slope of the ramp surface to unload the magnetic heads 17.

The board unit 21 comprises a body 21a formed of a flexible printed circuit board, which is secured to the bottom wall 12a of the base 12. Electronic components, such as a head amplifier, are mounted on the body 21a. The board unit 21 comprises a main flexible printed circuit (FPC) board 21b extending from the body 21a. An extended end of the main FPC 21b is connected to the vicinity of the bearing 26 of the carriage assembly 22. Further, the extended end is electrically connected to the magnetic heads 17 by cables (not shown) arranged on the arms 28 and suspensions 30. Connectors (not shown) for connection with the printed circuit board are mounted on the bottom surface of the body of the board unit 21.

As shown in FIG. 1, the HDD comprises a breather filter 46 and circulatory filter 48. The breather filter 46 is used to remove dust, moisture, and gases in the external air introduced into the case 10 through vent holes in the base 12. The circulatory filter 48 serves to trap dust produced in the case as a movable part or parts are operated. These filters 46 and 48 are arranged around the magnetic disks 16.

As shown in FIGS. 1 to 3 and 5, the HDD comprises a spoiler 50 for regulating airflow produced between the magnetic disks 16. The spoiler 50 is an integral structure of synthetic resin or the like, comprising a plate-like main body 52 and a plurality (e.g., three) of baffle plates (wings) 54 extending perpendicularly from the main body. A rectangular metal plate (shield plate or shield member) 56 of a magnetic material is embedded in the main body 52 so that it extends parallel to the main body. The upper and lower end edges of the metal plate 56 are exposed at the upper and lower ends, respectively, of the main body 52. Further, the spoiler 50 integrally comprises a fixing portion 60 laterally projecting from the main body 52. The fixing portion 60 is formed with a through-hole 61, through which a fixing screw can be passed, and a support shaft 62 extending parallel to the main body 52.

The main body 52 of the spoiler 50 is interposed between respective end portions of the bottom and top yokes 38*a* and 38*b*. Thus, the main body 52 and metal plate 56 are located near the outer peripheral edges of the magnetic disks 16 and parallel to the tangential direction of the outer peripheral edges of the magnetic disks. The main body 52 and metal plate 56 are set up substantially perpendicular to the bottom wall 12*a* of the base 12. In the base 12, the main body 52 forms the shroud between the sidewall 12*b* and the bearing 26 of the carriage assembly 22. The fixing portion 60 is secured to the yoke 38 and bottom wall 12*a* by inserting the support shaft 62 into an engaging hole in the bottom wall 12*a* and further driving a fixing screw 72 into the bottom wall 12*a* through a through-hole in the disk-side end portion of the top yoke 38*b* and the through-hole 61 in the fixing portion 60.

Each of the baffle plates 54 of the spoiler 50 extends perpendicularly from the main body 52 toward the central part of each corresponding magnetic disk 16. The baffle plates 54 extend parallel to the surfaces of the magnetic disks 16. The plates 54 are arranged axially relative to the spindle motor 18 in three stages spaced apart from one another. The first-stage baffle plate 54 is interposed between the top cover 13 and the first-stage magnetic disk 16; second-stage baffle plate 54 between the first- and second-stage magnetic disks 16; and third-stage baffle plate 54 between the second- and third-stage magnetic disks.

The baffle plates 54 of the spoiler 50 rectify internal flow that is produced as the magnetic disks rotate, thereby reducing disk flutter and disturbance during carriage loading. In this way, the high-speed HDD and high-density recording capacity are achieved. Further, the metal plate 56 of the spoiler 50 prevents leakage of flux from the VCM 24 toward the magnetic disks 16. Thus, it is unnecessary to use a return yoke that is conventionally formed in this portion.

Figure 6:
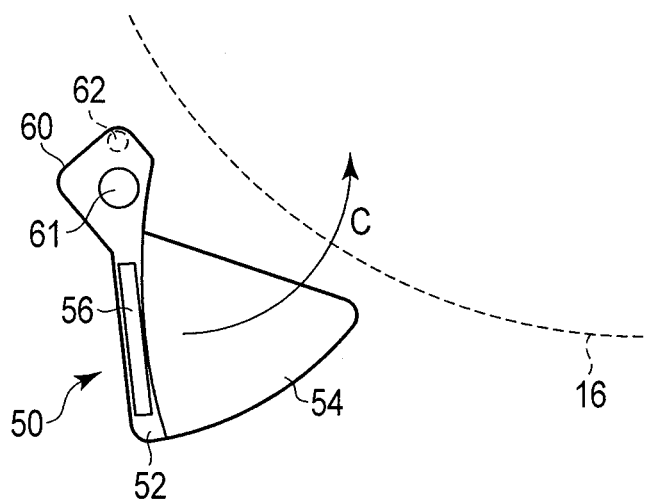
FIG. 6 is a plan view schematically showing how the spoiler is mounted in an assembly process for the HDD.

FIGS. 6 to 9 show assembly processes for the HDD constructed in this manner. Methods for assembling the spoiler 50 and yoke 38 will be described in succession. The first embodiment is an example of a magnetic circuit configuration to which the rotational insertion assembly of the spoiler 50 is applied. First, the spindle motor 18 and magnetic disks 16 are mounted on the base 12, as shown in FIG. 6. Then, the spoiler 50 is placed from above onto the bottom wall 12*a* of the base 12 in a position where it does not interfere with the outer peripheral edges of the magnetic disks 16. When this is done, the support shaft 62 of the spoiler 50 is inserted into the engaging hole in the bottom wall 12*a*.

Figure 7:
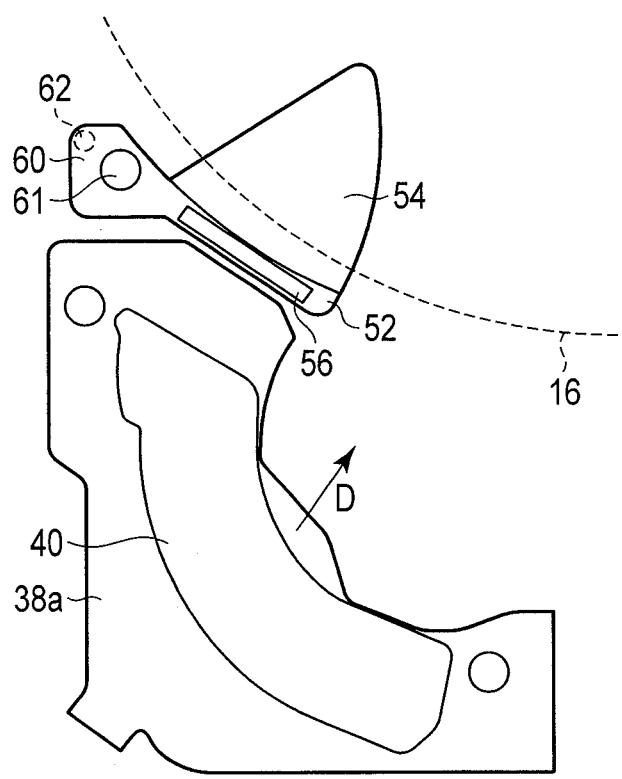
FIG. 7 is a plan view schematically showing how the spoiler is set between magnetic disks and a bottom yoke is set on the bottom wall of a case in an assembly process for the HDD.

As shown in FIGS. 6 and 7, the spoiler 50 is rotated in the direction of arrow C in FIG. 6 about the support shaft 62 to the position shown in FIG. 7, whereupon the baffle plates 54 are introduced between the magnetic disks 16. Thereafter, the bottom yoke 38*a* is placed onto the bottom wall 12*a* from above and further slid in the direction of arrow D in FIG. 7 to the position shown in FIG. 8. Thereupon, a part of the disk-side end of the bottom yoke 38*a* is interposed between the bottom wall 12*a* and the main body 52 and metal plate 56 of the spoiler 50. Then, both end portions of the bottom yoke 38*a* are attached to the bottom wall of the base by screws.

Subsequently, as shown in FIG. 9, the top yoke 38*b* is located opposite the bottom yoke 38*a* from above, the fixing screw 72 is screwed into the base 12 through a fixing hole 39 and the through-hole 61 of the spoiler 50, and the spoiler 50 and the end portion of the top yoke 38*b* are secured to the base. When this is done, the disk-side end portion of the top yoke 38*b* is put on the main body 52 and metal plate 56 of the spoiler 50. In this way, the main body 52 and metal plate 56 of the spoiler 50 are held between the bottom and top yokes 38*a* and 38*b* and located near and opposite the outer peripheral edges of the magnetic disks 16.

When the magnetic disks 16 rotate at high speed, according to the HDD constructed in this manner, airflow is produced along the direction of the rotation. This airflow is rectified by the main body 52 of the spoiler 50 and the facing surface 12*c* of the sidewall 12*b* that faces the outer peripheral edges of the magnetic disks 16 with a small gap therebetween. Further, airflows over the surfaces of the magnetic disks 16 are rectified by the baffle plates 54 of the spoiler 50. Thus, air turbulence can be suppressed, so that disk flutter can be reduced. Further, airflow disturbance on the carriage assembly 22 is suppressed. Thus, vibration of the magnetic disks due to airflow disturbance and disturbance displacement of the suspensions 30 can be reduced, so that the positioning accuracy of the magnetic heads relative to the magnetic disks is improved.

Furthermore, the metal plate 56 in the main body 52 of the spoiler 50 can prevent magnetic flux produced by the magnets 40 from leaking out toward the magnetic disks 16. It is unnecessary, therefore, to use a return yoke for this magnetic flux leakage prevention that is required in this position by the conventional structure. Thus, the shapes of the spoiler 50 and yoke 38 and methods for securing them can be freely designed without regard to interference between them during assembly and installation. Since no return yoke is required on the magnetic-disk side, a magnetic circuit can be configured so that the top yoke 38*b* is secured to the base 12 in a position near the magnetic disks, e.g., the position of the fixing hole 39. If the design flexibility of the screw fixing position of the top yoke 38*b* is increased, it can be very effectively reflected in countermeasure designs against oscillation of the magnetic heads by the resonance frequency control of the yokes, reduction in device performance due to residual yoke vibration, etc. Thus, many advantages can be obtained from this fixing method.

Further, secondary effects may be expected of the metal plate embedded in the main body 52 of the spoiler 50, including reduction in deformation of the spoiler by temperature contraction and improvement in dimensional accuracy during spoiler-resin molding operation.

According to the present embodiment, as described above, there may be provided a high-performance disk drive with improved reliability, in which the shapes of a spoiler and yoke and methods for securing them are designed with increased flexibility and magnetic flux leakage on the disk side is prevented.

The following is a description of HDDs according to an alternative embodiment. In the description of the alternative embodiment to follow, like reference numbers are used to designate the same parts as those of the first embodiment, and a detailed description thereof is omitted. Different parts will be mainly described in detail.

Second Embodiment

The following is a description of an HDD according to a second embodiment.

FIGS. 10 to 12 show assembly processes for a spoiler and yoke of the HDD according to the second embodiment, and FIG. 13 shows the yoke and a metal plate of the spoiler in an assembled state.

According to the second embodiment, a spoiler 50 is assembled by sliding insertion. First, a bottom yoke 38a is secured to a bottom wall in a housing by screws in the position shown in FIG. 10. In the present embodiment, an abutment rib 70a integrally protrudes from the upper surface of an end portion of the bottom yoke 38a on the side of magnetic disks 16. The abutment rib 70a extends substantially parallel to the tangential direction of the magnetic disks 16 and projects upward or toward a top yoke 38b from the bottom yoke 38a. Likewise, an abutment rib 70b integrally protrudes from the lower surface of an end portion of the top yoke 38b on the side of the magnetic disks 16. The abutment rib 70b extends substantially parallel to the tangential direction of the magnetic disks 16 and projects downward or toward the bottom yoke 38a from the top yoke 38b.

As shown in FIG. 10, the spoiler 50 is slidingly inserted, in the direction of arrow F, from a position where it does not interfere with the outer peripheral edges of the magnetic disks 16 into the position of FIG. 11 between the magnetic disks. As this is done, a metal plate 56 embedded in a main body 52 of the spoiler 50 is grounded to the abutment rib 70a on the bottom yoke 38a. In the present embodiment, a support shaft of a fixing portion 60 is omitted.

Finally, as shown in FIG. 12, the top yoke 38b is located from above, a fixing screw 72 is screwed into the bottom wall of a base through a fixing hole 39 in the top yoke 38b and a through-hole 61 in the spoiler 50, and the fixing portion 60 of the spoiler 50 and an end portion of the top yoke 38b are secured to the base.

According to the second embodiment, as shown in FIG. 13, the top yoke 38b also comprises the abutment rib (rib-like projection) 70b similar to that of the bottom yoke 38a. The metal plate 56 of the spoiler 50 interposed between the bottom and top yokes 38a and 38b is grounded to the abutment ribs 70a and 70b on the bottom and top yokes, respectively. Based on this grounding configuration, a magnetically closed interval can be formed such that leakage magnetic flux from magnets 40 can be prevented from being diffracted through gaps between the metal plate and yokes and leaking out toward the magnetic disks 16, so that a high shielding effect can be obtained.

The shielding effect of the metal plate (shield plate or shield member) 56 against the leakage magnetic flux was inspected by magnetic field analysis simulation. FIGS. 14 to 16 show the results of simulation of leakage magnetic flux density distribution. FIG. 14 shows the result of an analysis on a comparative example without a shield member, such as a return yoke, between the yokes and magnetic disks. FIG. 15 shows the result of an analysis according to the first embodiment using the metal plate 56 with 1.0 mm thick. FIG. 16 shows the result of an analysis according to the second embodiment using the metal plate 56 with 0.5 mm thick. Conventional stainless steel was used for the analyzed metal plates 56. In each of these drawings, the point indicated by a cross represents a position corresponding to the outermost recording area of each magnetic disk, and the result of a magnetic flux density analysis on this point is numerically shown in each drawing.

In the case of the first embodiment shown in FIG. 15, the spread of leakage magnetic flux is reduced, and an effect is produced by the use of the 1.0-mm-thick metal plate 56 that the magnetic flux density in the outermost recording area of each magnetic disk becomes about 30% lower than in the comparative example. Since the a small magnetic gap free from a magnetic material exists between the yoke and the metal plate 56, however, the way the magnetic flux is diffracted, leaks, and spreads can be recognized in some measure through the gap. In the case of the second embodiment shown in FIG. 16, on the other hand, the metal plate 56, though as thin as 0.5 mm, is grounded to the yoke 38 without leaving a magnetic gap. Therefore, leakage and spread of the magnetic flux to the magnetic disks can be suppressed more than in the case shown in FIG. 15. Thus, it can be seen that a very high shielding effect can be obtained such that the magnetic flux density in the outermost recording area of each magnetic disk is reduced by about 60%.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the method for assembling the spoiler is not limited to the rotational or sliding insertion and may be replaced with some other free assembly method. The yoke fixing position need not always be coincident with the spoiler fixing position and the fixing positions may be separately provided. Further, the metal plate in the spoiler may be located nearer to the magnets or to the magnetic disks without being confined between the yokes. The metal plate for use as a shield member may be a bent plate or be formed of a plurality of metal plates applied to the spoiler. The metal plate may be secured to the outer surface of the main body of the spoiler instead of being embedded in the main body. The shield member may be of a shape other than the plate-like shape only if it can prevent magnetic flux leakage. The number of magnetic disks is not limited to three and may be two or four or more. The number of baffle plates of the spoiler may be varied depending on the number of magnetic disks.

What is claimed is:

1. A disk drive comprising:
a case comprising a base with a bottom wall;
a drive motor on the bottom wall of the base;
a plurality of disk recording mediums rotatable by the drive motor;
a magnetic head configured to perform data processing on the disk recording mediums;
a carriage on the bottom wall of the base, configured to support the magnetic head for movement relative to the disk recording mediums;
a drive section comprising a bottom yoke on the bottom wall, a top yoke located opposite the bottom yoke with a gap therebetween, and a magnet on at least the bottom yoke, and configured to drive the carriage; and
a spoiler comprising a main body, which comprises a magnetic shield member, and a baffle plate extending from the main body to a space between the adjacent disk recording mediums, the magnetic shield member of the spoiler being formed of a magnetic material, and being located opposite peripheral edge portions of the disk recording mediums and between the bottom yoke and the top yoke, wherein the main body and the baffle plate are formed of a material different from that of the magnetic shield member, and the drive section comprises a return yoke connecting the bottom yoke and top yoke to each other at a position spaced apart from the spoiler.

2. The disk drive of claim 1, wherein the bottom yoke comprises an abutment rib projecting toward the top yoke, the top yoke comprises an abutment rib projecting toward the bottom yoke, and the magnetic shield member is sandwiched between the abutment ribs and magnetically connected to the bottom and top yokes.

3. The disk drive of claim 2, wherein the spoiler integrally comprises a fixing portion extending from the main body and a support shaft extending from the fixing portion and rotatably passed through the bottom wall.

4. The disk drive of claim 2, wherein the bottom yoke comprises an end portion attached to the bottom wall by a screw in the vicinity of the outer peripheral edges of the disk recording mediums.

5. The disk drive of claim 1, wherein the spoiler integrally comprises a fixing portion extending from the main body and a support shaft extending from the fixing portion and rotatably passed through the bottom wall.

6. The disk drive of claim 5, wherein the fixing portion comprises a through-hole through which a fixing screw is screwed into the bottom wall.

7. The disk drive of claim 6, wherein the bottom yoke comprises an end portion attached to the bottom wall by a screw in the vicinity of the outer peripheral edges of the disk recording mediums.

8. The disk drive of claim 5, wherein the bottom yoke comprises an end portion attached to the bottom wall by a screw in the vicinity of the outer peripheral edges of the disk recording mediums.

9. The disk drive of claim 1, wherein the bottom yoke comprises an end portion attached to the bottom wall by a screw in the vicinity of the outer peripheral edges of the disk recording mediums.

10. A disk drive comprising:
a case comprising a base with a bottom wall;
a drive motor on the bottom wall of the base;
a plurality of disk recording mediums rotatable by the drive motor;
a magnetic head configured to perform data processing on the disk recording mediums;
a carriage on the bottom wall of the base, configured to support the magnetic head for movement relative to the disk recording mediums;
a drive section comprising a bottom yoke on the bottom wall, a top yoke located opposite the bottom yoke with a gap therebetween, and a magnet on at least the bottom yoke, and configured to drive the carriage; and
a spoiler comprising a main body, which comprises a magnetic shield member, and a baffle plate extending from the main body to a space between the adjacent disk recording mediums,
wherein the magnetic shield member of the spoiler comprises a plate-shaped structure and is located opposite peripheral edge portions of the disk recording mediums and between the bottom and top yokes, and
the bottom yoke comprises an abutment rib projecting toward the top yoke, the top yoke comprises an abutment rib projecting toward the bottom yoke, and the magnetic shield member is sandwiched between the abutment ribs and magnetically connected to the bottom and top yokes.

11. The disk drive of claim 10, wherein the spoiler integrally comprises a fixing portion extending from the main body and a support shaft extending from the fixing portion and rotatably passed through the bottom wall.

12. The disk drive of claim 11, wherein the fixing portion comprises a through-hole through which a fixing screw is screwed into the bottom wall.

13. The disk drive of claim 12, wherein the bottom yoke comprises an end portion attached to the bottom wall by a screw in the vicinity of the outer peripheral edges of the disk recording mediums.

14. The disk drive of claim 11, wherein the bottom yoke comprises an end portion attached to the bottom wall by a screw in the vicinity of the outer peripheral edges of the disk recording mediums.

15. The disk drive of claim 10, wherein the bottom yoke comprises an end portion attached to the bottom wall by a screw in the vicinity of the outer peripheral edges of the disk recording mediums.

16. A disk drive comprising:
a case comprising a base with a bottom wall;
a drive motor on the bottom wall;
a plurality of disk recording mediums rotatable by the drive motor;
a magnetic head configured to perform data processing on the disk recording mediums;
a carriage on the bottom wall, configured to support the magnetic head for movement relative to the disk recording mediums;
a drive section comprising a bottom yoke on the bottom wall, a top yoke located opposite the bottom yoke with a gap therebetween, and a magnet, and configured to drive the carriage; and
a spoiler comprising a main body, which comprises a magnetic shield member, and a baffle plate extending from the main body to a space between the adjacent disk recording mediums, the magnetic shield member being formed of a magnetic material different from a material of the main body and the baffle plate, and being located between the bottom yoke and the top yoke.

17. The disk drive of claim 16, wherein the bottom yoke comprises an abutment rib projecting toward the top yoke, the top yoke comprises an abutment rib projecting toward the bottom yoke, and the magnetic shield member is sandwiched between the abutment ribs and magnetically connected to the bottom and top yokes.

18. The disk drive of claim 16, wherein the spoiler integrally comprises a fixing portion extending from the main body and a support shaft extending from the fixing portion and rotatably passed through the bottom wall.

19. The disk drive of claim 18, wherein the fixing portion comprises a through-hole through which a fixing screw is screwed into the bottom wall.

20. The disk drive of claim 16, wherein the bottom yoke comprises an end portion attached to the bottom wall by a screw in the vicinity of the outer peripheral edges of the disk recording mediums.

* * * * *